(12) United States Patent
Wang et al.

(10) Patent No.: US 11,408,807 B2
(45) Date of Patent: Aug. 9, 2022

(54) TEST DEVICE AND METHOD FOR CONTROLLING LOW-TEMPERATURE ENVIRONMENT

(71) Applicant: INNER MONGOLIA UNIVERSITY OF TECHNOLOGY, Inner Mongolia (CN)

(72) Inventors: Xiaoxiao Wang, Inner Mongolia (CN); Shuguang Liu, Inner Mongolia (CN); Changwang Yan, Inner Mongolia (CN); Heng Li, Inner Mongolia (CN)

(73) Assignee: INNER MONGOLIA UNIVERSITY OF TECHNOLOGY, Inner Mongolia (CN)

( * ) Notice: Subject to any disclaimer, the term of this patent is extended or adjusted under 35 U.S.C. 154(b) by 340 days.

(21) Appl. No.: 16/728,984

(22) Filed: Dec. 27, 2019

(65) Prior Publication Data

US 2020/0209127 A1   Jul. 2, 2020

(30) Foreign Application Priority Data

Dec. 28, 2018 (CN) .......................... 201811628641.6

(51) Int. Cl.
*G01N 3/54* (2006.01)
*G01N 3/18* (2006.01)
*G01N 3/42* (2006.01)

(52) U.S. Cl.
CPC ............. *G01N 3/54* (2013.01); *G01N 3/18* (2013.01); *G01N 3/42* (2013.01); *G01N 2203/0019* (2013.01); *G01N 2203/0075* (2013.01); *G01N 2203/0078* (2013.01); *G01N 2203/0228* (2013.01)

(58) Field of Classification Search
CPC ............. G01N 3/54; G01N 2203/0019; G01N 2203/0075; G01N 2203/0078; G01N 2203/0228; G01N 3/18; G01N 3/42
USPC .......................................................... 73/81
See application file for complete search history.

(56) References Cited

FOREIGN PATENT DOCUMENTS

| CN | 102590468 B | * | 10/2014 |
| CN | 105241753 A | * | 1/2016 |
| CN | 108871968 A | * | 11/2018 |

* cited by examiner

*Primary Examiner* — Marrit Eyassu
(74) *Attorney, Agent, or Firm* — Berenato & White, LLC

(57) ABSTRACT

The invention provides a test device and method for controlling a low-temperature environment. A double-layer stainless steel plate forms an interlayer cavity of a cooling box; four walls of the cooling box are provided with a heat insulation plate; a probe thermometer is disposed on a side wall of the cooling box; both the top of a press and the bottom of an indenter of a universal testing machine are provided with a fiberglass reinforced plastic pipe cover; the cooling box is disposed on the press; the indenter is disposed in the cooling box through a through hole; a cold bath device communicate with the cooling box; the cold bath device and the interlayer cavity are provided with a freezing liquid; a stress-strain data acquisition instrument is connected to a sample in the cooling box through a strain gage and a strain gage connection line.

4 Claims, 4 Drawing Sheets

TEST DEVICE AND METHOD FOR CONTROLLING LOW-TEMPERATURE ENVIRONMENT

TECHNICAL FIELD

The invention relates to low-temperature test devices, and in particular, to a test device and method for controlling a low-temperature environment.

BACKGROUND

In cold regions of northwest China, the average temperature in winter is between −3.5° C. and −15° C., the average temperature difference in winter is about 12° C. from west to east, and the extreme minimum temperature is between −26° C. and −50° C. In most regions, the winter is as long as 5 months or more. Most concrete in these regions is affected by the low temperature of the harsh environment. Various properties of concrete (physical properties, mechanical properties, and durability) will have varying degrees of change. Among them, mechanical properties (compressive strength, elastic modulus, etc.) are important performance indicators for engineering materials. Therefore, testing and studying the influence of a low-temperature environment on the mechanical properties of concrete can more accurately predict the service performance and service life of concrete materials.

The mechanical properties of concrete in low-temperature environments are researched domestically and abroad, and relevant research is mainly focused on natural low temperatures and ultralow-temperature environments. However, as the performance characteristics of concrete components are obviously different in various places, the research results domestically and abroad can only be used as a reference, and cannot be directly applied. Moreover, China has not yet formulated codes and standards for concrete under low temperatures, and it is necessary to provide certain research data and research results in combination with concrete in different regions.

At present, commonly used low-temperature environment test devices can be divided into two types. One is a device that can only cool down, such as a refrigerator and a freeze-thaw box. The other is a device that integrates cooling and loading, such as Takashai's low-temperature device. The device can quickly cool down a test environment by using liquid nitrogen as a cooling medium, and can achieve the operation of cooling and loading simultaneously, but it has some disadvantages:

(1) The loading device is integrated with the heat insulation box, so it is not convenient to disassemble. Although the box can ensure the uniformity of the ambient temperature, it will affect the subsequent use of the loading device. At present, the universal testing machine is a loading device configured by most universities and research institutes. This type of testing machine has a very large indenter, making it difficult to install the heat insulation box.

(2) The temperature used in a low-temperature concrete test is mostly used to simulate the ambient temperature of an outdoor building. Liquid nitrogen cooling can reduce the temperature to a minimum of −195° C., but the temperature drop range is too large. In addition, the test operation process requires equipment such as a liquid nitrogen cylinder, which is expensive and has a certain risk.

(3) When the universal testing machine is working, the contact surface between the test piece and the universal testing machine will generate heat. However, in this low-temperature device, the indenter of the universal testing machine and the press for placing the test piece are not protected by heat insulation means.

SUMMARY

To overcome the above-mentioned shortcomings of the prior art, the invention provides a test device and method for controlling a low-temperature environment.

To achieve the above objective, the invention provides the following technical solutions.

The test device for controlling a low-temperature environment, includes a universal testing machine, a cooling box, a cold bath device, a probe thermometer, and a stress-strain data acquisition instrument, where the cooling box is formed by welding a double-layer stainless steel plate; the double-layer stainless steel plate forms an interlayer cavity of the cooling box; the bottom of the cooling box is hollow; the top of the cooling box is provided with a through hole; one side of the cooling box is provided with a liquid inlet near an upper side, and the other side of the cooling box is provided with a liquid outlet near a lower side; both the liquid inlet and the liquid outlet communicate with the interlayer cavity; the same side of the liquid outlet is further provided with a test piece access; the test piece access is provided with a sealing door hinged to a side wall of the cooling box; four walls of the cooling box are provided with a heat insulation plate; the probe thermometer is disposed on a side wall of the cooling box; a probe of the probe thermometer is disposed inside the cooling box; the cold bath device and the interlayer cavity are provided with a freezing liquid;

the universal testing machine includes a press and an indenter disposed above the press; both the top of the press and the bottom of the indenter are provided with a fiberglass reinforced plastic pipe cover; the cooling box is disposed on the press; the indenter is disposed in the cooling box through the through hole; an outlet of the cold bath device communicates with the liquid inlet of the cooling box through a liquid inlet tube; an inlet of the cold bath device communicates with the liquid outlet of the cooling box through a liquid outlet tube; the stress-strain data acquisition instrument is connected to a sample in the cooling box through a strain gage and a strain gage connection line.

Preferably, the freezing liquid is water plus an alcohol, and the volume ratio of the water to the alcohol is about 3:7.

Preferably, the outlet and the inlet of the cold bath device are respectively provided with a liquid discharge pump and a liquid inlet pump; the liquid inlet tube communicates with an outlet of the liquid discharge pump, and the liquid outlet communicates with an inlet of the liquid inlet pump.

Another objective of the invention is to provide a test method for controlling a low-temperature environment, including the following test steps:

step 1, installing the fiberglass reinforced plastic pipe cover on both the top of the press and the bottom of the indenter;

step 2, placing the cooling box on the press, and extending the indenter into the body of the cooling box;

step 3, communicating one end of the liquid inlet tube with the outlet of the liquid discharge pump, and communicating the other end of the liquid inlet tube with the liquid inlet of the cooling box; communicating one end of the liquid outlet tube with the inlet of the liquid inlet pump, and communicating the other end of the liquid outlet tube with the liquid outlet of the cooling box; wrapping a joint of the liquid inlet tube and the liquid outlet tube with a Teflon® or thread seal tape to prevent leakage, and pouring the freezing liquid into the cold bath device;

step 4, putting a plurality of samples with different moisture content into a refrigerator to cool down, and reducing the temperature to $t_1°$ C., where $-40°$ C.$\leq t_1°$ C.$\leq 0°$ C.;

step 5, opening the cold bath device, and adjusting the temperature of the freezing liquid to $t_1°$ C.;

step 6, discharging the cooled freezing liquid into the interlayer cavity of the cooling box with the liquid discharge pump, and after the cold bath device is operated for a period of time, detecting a temperature in the center of the cooling box with the probe thermometer;

step 7, when the temperature in the cooling box reaches $t_1°$ C., taking out a sample reaching $t_1°$ C. from the refrigerator, and attaching the strain gage; connecting the strain gage to the stress-strain data acquisition instrument through the strain gage connection line; then placing the sample attached with the strain gage into the cooling box through the test piece access, and closing the test piece access;

step 8, turning on the universal testing machine to perform a mechanical test; applying a pressure to the sample through the indenter, and obtaining required data through the stress-strain data acquisition instrument;

step 9, setting the test temperature to $t_2°$ C., $t_2°$ C.$\leq t_1°$ C.; repeating steps 4 to 8 to conduct the mechanical test of concrete at a low temperature until the temperature drops to $-40°$ C.;

step 10, after the test is completed, closing the cold bath device, and discharging the freezing liquid in the interlayer cavity of the cooling box into the cold bath device through the liquid inlet pump; and step 11, disassembling the liquid inlet tube and the liquid outlet tube, and cleaning the interlayer cavity of the cooling box with clean water.

The test device and method for controlling a low-temperature environment provided by the invention have the following beneficial effects.

(1) The device is based on an existing universal testing machine. Through the combination of the cooling box, the cold bath device, the probe thermometer and the stress-strain data acquisition instrument, the device can accurately control and reuse a low temperature. The device can test the mechanical properties of concrete under a low-temperature environment. The device is simply shaped, simple to manufacture and operate, and convenient to disassemble and assemble. The device can also improve the utilization rate of the universal testing machine.

(2) The invention can more effectively improve the utilization rate of the universal testing machine and maximize the test range of the universal testing machine.

(3) In the invention, the sample is placed in the cooling box, and the temperature of the sample is tested by using the probe thermometer, ensuring that the sample is quickly and efficiently cooled to a required temperature. The probe thermometer fixed outside the cooling box keeps the internal temperature of the sample consistent with the ambient temperature, which improves the accuracy of a test result.

(4) The cooling box and the cold bath device of the invention are simply manufactured, convenient to disassemble, and low-cost.

(5) The indenter and the fixture of the universal testing machine are protected by using a glass reinforced plastic, which functions for heat insulation and blocks heat generated by friction between the sample and the indenter. In this way, the contact surface stays consistent with a low ambient temperature, which is convenient to achieve a predetermined requirement.

(6) The invention can test the compressive strength, flexural strength, elastic modulus and stress and strain of concrete with different moisture contents under different low temperatures, and the test result has high accuracy.

DESCRIPTION OF REFERENCE NUMERALS

1. indenter, 2. cooling box, 3. sample, 4. press, 5. cold bath device, 6. liquid inlet tube, 7. liquid outlet tube, 8. stress-strain data acquisition instrument, 9. probe thermometer, 10. fiberglass reinforced plastic pipe cover, 11. strain gage connection line, 12. liquid inlet, 13. liquid outlet, 14. access, 15. interlayer cavity, 16. heat insulation plate, 17. liquid discharge pump, 18. liquid inlet pump, 19. strain gage, 20. computer, 21. through hole, 22. sealing door.

DETAILED DESCRIPTION

The specific implementations of the invention are further described below with reference to the accompanying drawings. The following embodiments are only used for illustrating the technical solutions of the invention more clearly, and are not intended to limit the claimed scope of the invention.

It should be understood that, in the description of the invention, orientations or position relationships indicated by terms "center", "longitudinal", "crosswise", "length", "width", "thickness", and "upper", "lower", "front", "back", "left", "right", "vertical", "horizontal", "top", "bottom", "internal", "external", "axial", "radial", and "circumferential" etc. are orientations or position relationships shown in the accompanying drawings. These terms are merely intended to facilitate description of the technical solutions of the invention and simplify the description, rather than to indicate or imply that the mentioned apparatus or components must have a specific orientation and be constructed and operated in a specific orientation. Therefore, these terms should not be understood as a limitation to the invention.

Moreover, terms such as "first" and "second" are used only for the purpose of description, and are not intended to indicate or imply relative importance. It should be noted that, in the description of the invention, unless otherwise clearly specified and limited, terms "interconnect" and "connect" should be understood in a broad sense. For example, connection may be fixed connection, removable connection or integrated connection, may be mechanical connection or electrical connection, may be direct connection or indirect connection, and may be connection by an intermediate medium. For those of ordinary skill in the art, the specific meanings of the above terms in the invention can be understood according to specific situations. In the description of the invention, unless otherwise stated, the meaning of "a plurality of" is two or more, which will not be described in detail herein.

Figure 1:
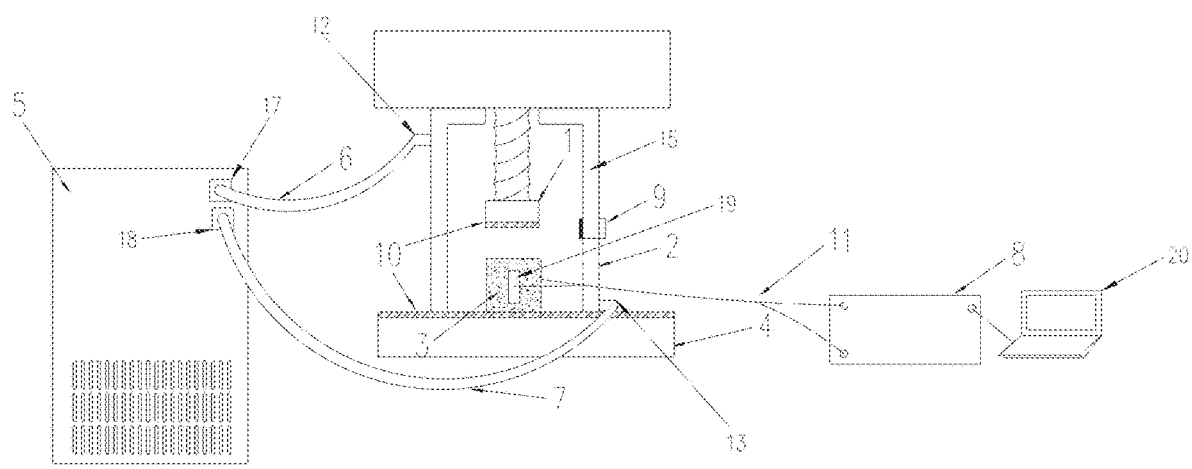
FIG. 1 is a schematic structural diagram of a test device for controlling a low-temperature environment according to an embodiment of the invention.
Figure 2:
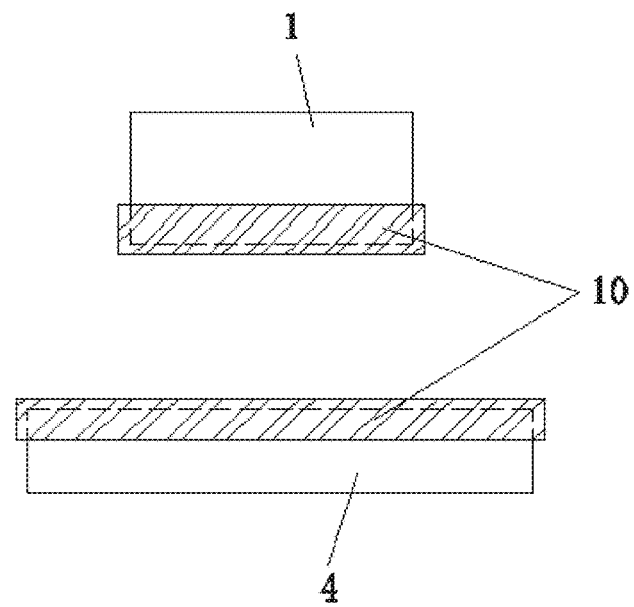
FIG. 2 is a schematic diagram of a heat insulation treatment of a universal testing machine.
Figure 3:
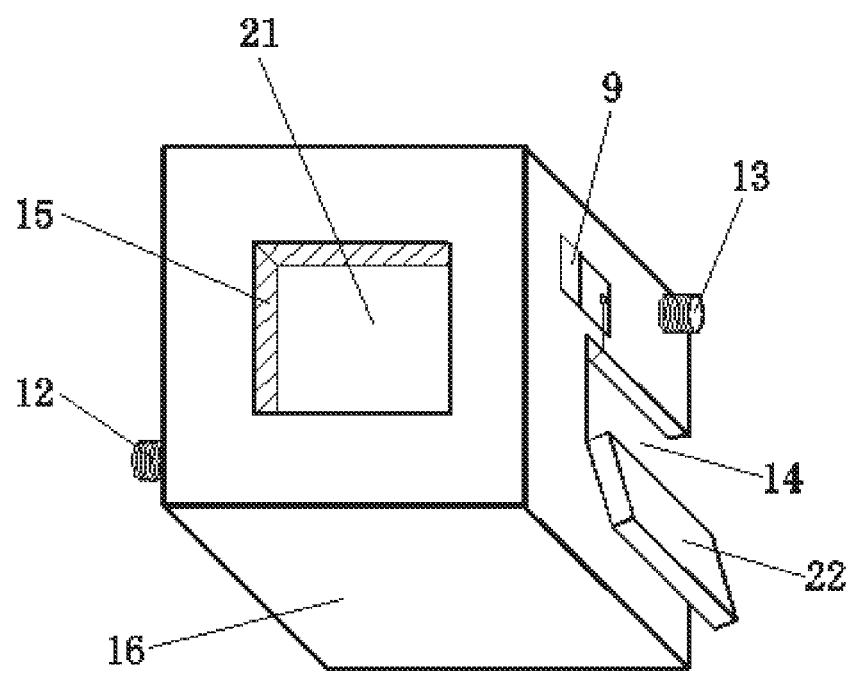
FIG. 3 is a schematic diagram of a cooling box.

The invention provides a test device for controlling a low-temperature environment, specifically shown in FIG. 1 to FIG. 3, including a universal testing machine, a cooling box 2, a cold bath device 5, a probe thermometer 9, and a stress-strain data acquisition instrument 8.

The cooling box 2 is formed by welding a double-layer stainless steel plate. The double-layer stainless steel plate forms an interlayer cavity 15 of the cooling box 2. The heat transfer coefficient of the stainless-steel plate is large enough to evenly transfer the temperature of a freezing liquid in the interlayer cavity 15 to a cavity of the box, so as to provide an ambient temperature for a test. The bottom of the cooling box 2 is hollow. The top of the cooling box 2 is provided with a through hole 21. One side of the cooling box 2 is provided with a liquid inlet 12 near an upper side, and the other side of the cooling box 2 is provided with a liquid outlet 13 near a lower side. Both the liquid inlet 12 and the liquid outlet 13 communicate with the interlayer cavity 15. The same side of the liquid outlet 13 is further provided with a test piece access 14. The test piece access 14 is provided with a sealing door 22 hinged to a side wall of the cooling box 2. Four walls of the cooling box 2 are provided with a heat insulation plate 16. The function of the heat insulation plate 16 is to wrap an outer wall of the cooling box 2. Here, the wrapping material is a layer of heat insulation material, which can be understood as a foam board, etc., so that the temperature of the freezing liquid in the interlayer cavity 15 is transferred inwards towards the body of the box, rather than outwards. The probe thermometer 9 is disposed on a side wall of the cooling box 2. A probe of the probe thermometer 9 is disposed inside the cooling box 2 to test the ambient temperature of a sample. The cold bath device 5 and the interlayer cavity 15 are provided with a freezing liquid. In this embodiment, the cold bath device 5 is an existing temperature control device. The cold bath device 5 is provided with a temperature adjustment period. The cold bath device 5 is provided with a control panel. The control panel can be used to conveniently set an internal adjustment temperature.

The universal testing machine includes a press 4 and an indenter 1 disposed above the press 4. Both the top of the press 4 and the bottom of the indenter 1 are provided with a fiberglass reinforced plastic pipe cover 10. When a test is completed, the fiberglass reinforced plastic pipe cover 10 disposed on the indenter 1 and the press 4 can be completely disassembled without causing damage to the instrument, which is convenient for a subsequent test. The indenter 1 and the press 4 of the universal testing machine are wrapped with the fiberglass reinforced plastic pipe cover 10. The indenter 1 and the press 4 are made of steel with a relatively large heat transfer coefficient. When a low-temperature sample contacts with the indenter 1 and the press 4, the temperature and energy of the sample are consumed, and heat is generated by friction, which can easily cause rust on the contact surface. Moreover, it will cause the vertical temperature of the low-temperature sample to be uneven, affecting the result of the low-temperature test of concrete. Therefore, the indenter 1 and the press 4 of the universal testing machine are protected by using the fiberglass reinforced plastic pipe cover 10, which functions for heat insulation and blocks heat generated by friction between the sample 3 and the indenter 1. In this way, the contact surface keeps consistent with a low ambient temperature, which is convenient to achieve a predetermined requirement.

The cooling box 2 is disposed on the press 4. The indenter 1 is disposed in the cooling box 2 through the through hole 21. An outlet of the cold bath device 5 communicates with the liquid inlet 12 of the cooling box 2 through a liquid inlet tube 6. An inlet of the cold bath device 5 communicates with the liquid outlet 13 of the cooling box 2 through a liquid outlet tube 7. The stress-strain data acquisition instrument 8 is connected to the sample 3 in the cooling box 2 through a strain gage 19 and a strain gage connection line 11. The low-temperature constant-temperature cold bath device 5 is used as a cooling source for concrete at a low temperature. The cold bath device simulates a low-temperature environment in winter in northwest China or other similar location to complete a test, for example, a compressive strength test of concrete at a low temperature. The cold bath device 5 is an important component of the test device. It is a cooling source for a low-temperature concrete test, and also a cold source for ensuring the ambient temperature. After the freezing liquid is added for external circulation, precise temperature control can be performed within a certain temperature range. The range is from −40° C. to 0° C., which can meet the temperature requirement of a cold region in northwest China or elsewhere.

In this embodiment, the freezing liquid in the interlayer cavity 15 and the cold bath device 5 is water plus an alcohol, and a volume ratio of the water to the alcohol is about 3:7. The freezing liquid of water plus alcohol is a low-cost, recyclable, and low-risk medium.

The outlet and the inlet of the cold bath device 5 are respectively provided with a liquid discharge pump 17 and a liquid inlet pump 18. The liquid inlet tube 6 communicates with an outlet of the liquid discharge pump 17, and the liquid outlet 13 communicates with an inlet of the liquid inlet pump 18. The external circulation is used to pump the cooling medium into the interlayer cavity 15 of the cooling box 2, so that the center of the cooling box 2 can be uniformly cooled down, ensuring that the ambient temperature of the sample 3 reaches a specified low temperature during loading.

The present embodiment further provides a test method for controlling a low-temperature environment, specifically including the following steps:

step 1, install the fiberglass reinforced plastic pipe cover 10 on both the top of the press 4 and the bottom of the indenter 1;

step 2, place the cooling box 2 on the press 4, and extend the indenter 1 into the body of the cooling box 2;

step 3, communicate one end of the liquid inlet tube 6 with the outlet of the liquid discharge pump 17, and communicate the other end of the liquid inlet tube 6 with the liquid inlet 12 of the cooling box 2; communicate one end of the liquid outlet tube 7 with the inlet of the liquid inlet pump 18, and communicate the other end of the liquid outlet tube 7 with the liquid outlet 13 of the cooling box 2; wrap a joint of the liquid inlet tube 6 and the liquid outlet tube 7 with a Teflon® or thread seal tape to prevent leakage, and pour the freezing liquid into the cold bath device 5;

step 4, put a plurality of samples 3 with different moisture contents into a refrigerator to cool down, and reduce the temperature to $t_1$° C., where −40° C.≤$t_1$° C.≤0° C.; specifically, $t_1$° C. is a variable, and may be −5° C., −10° C., −15° C., and the like within a required temperature range;

step 5, open the cold bath device 5, and adjust the temperature of the freezing liquid to $t_1$° C.;

step 6, discharge the cooled freezing liquid into the interlayer cavity 15 of the cooling box 2 by the liquid discharge pump 17, and after the cold bath device 5 is operated for a period of time, detect a temperature in the center of the cooling box 2 by the probe thermometer 9;

step 7, when the temperature in the cooling box 2 reaches $t_1°$ C., take out a sample 3 reaching $t_1°$ C. from the refrigerator, and attach the strain gage 19; connect the strain gage 19 to the stress-strain data acquisition instrument 8 through the strain gage connection line 11; then place the sample 3 attached with the strain gage 19 into the cooling box 2 through the test piece access 14, and close the test piece access 14;

step 8, set a pressurization rate of the universal testing machine to 0.1 KN/s, and then turn on the universal testing machine for a compressive strength test; apply a pressure to the sample 3 through the indenter 1, and pressurize at the rate of 0.1 KN/s until the concrete is crushed (this universal testing machine will stop abruptly when a test block is crushed); obtain required data by the stress-strain data acquisition instrument 8, where the test frequency is 10 times of strain measurement per 1 s; the universal testing machine can measure the stress, and the stress-strain data acquisition instrument 8 can measure the strain; the measured data are transmitted to a computer 20 in time for storage;

step 9, set the test temperature to $t_2°$ C., $t_2°$ C.$\leq t_1°$ C.; repeat steps 4 to 8 to conduct the mechanical test of concrete at a low temperature until the temperature drops to −40° C.;

step 10, after the test is completed, close the cold bath device 5, and discharge the freezing liquid in the interlayer cavity 15 of the cooling box 2 into the cold bath device 5 through the liquid inlet pump 18; and step 11, disassemble the liquid inlet tube 6 and the liquid outlet tube 7, and clean the interlayer cavity 15 of the cooling box 2 with clean water.

In this embodiment, the size of the sample can be selected from 100 mm*100 mm*100 mm, 100 mm*100 mm*400 mm or 150 mm*150 mm*450 mm. The compressive strength, flexural strength, elastic modulus, stress and strain, and the like of concrete with different moisture contents under different low temperatures can be tested.

The above method is further verified below by a specific embodiment, and the test data using the above steps are as follows:

(1) Raw Materials for Test
Cement: Jidong P.042.5 ordinary Portland cement; fly ash: class-I fly ash from Ordos Jungar Banner Power Plant; coarse aggregate: pumice aggregate from central Inner Mongolia, with a particle size ranging from 9.5 mm to 22.5 mm; fine aggregate: natural river sand, with a fineness modulus of 2.55, a mud content of 2.17%, a bulk density of 1590 kg/m³, an apparent density 2550 kg/m³, a moisture content of 2.31%, and having good grain size distribution; water reducer: naphthalene-based ordinary water reducer, with a water reducing rate of 18%, and having no corrosion effect on a steel bar; and water: ordinary tap water.

The raw materials are prepared into strength grade LC30 concrete, with a mix proportion shown in Table 1.

TABLE 1

Mix proportion and performance of natural pumice concrete

| Strength grade | Cement/ Kg | Water/ Kg | Coarse aggregate/ Kg | River sand/ Kg | Fly ash/ Kg | Water reducer/ Kg | Sand ratio |
|---|---|---|---|---|---|---|---|
| LC30 | 320 | 144 | 562 | 739 | 80 | 4.0 | 0.4 |

Figure 4:
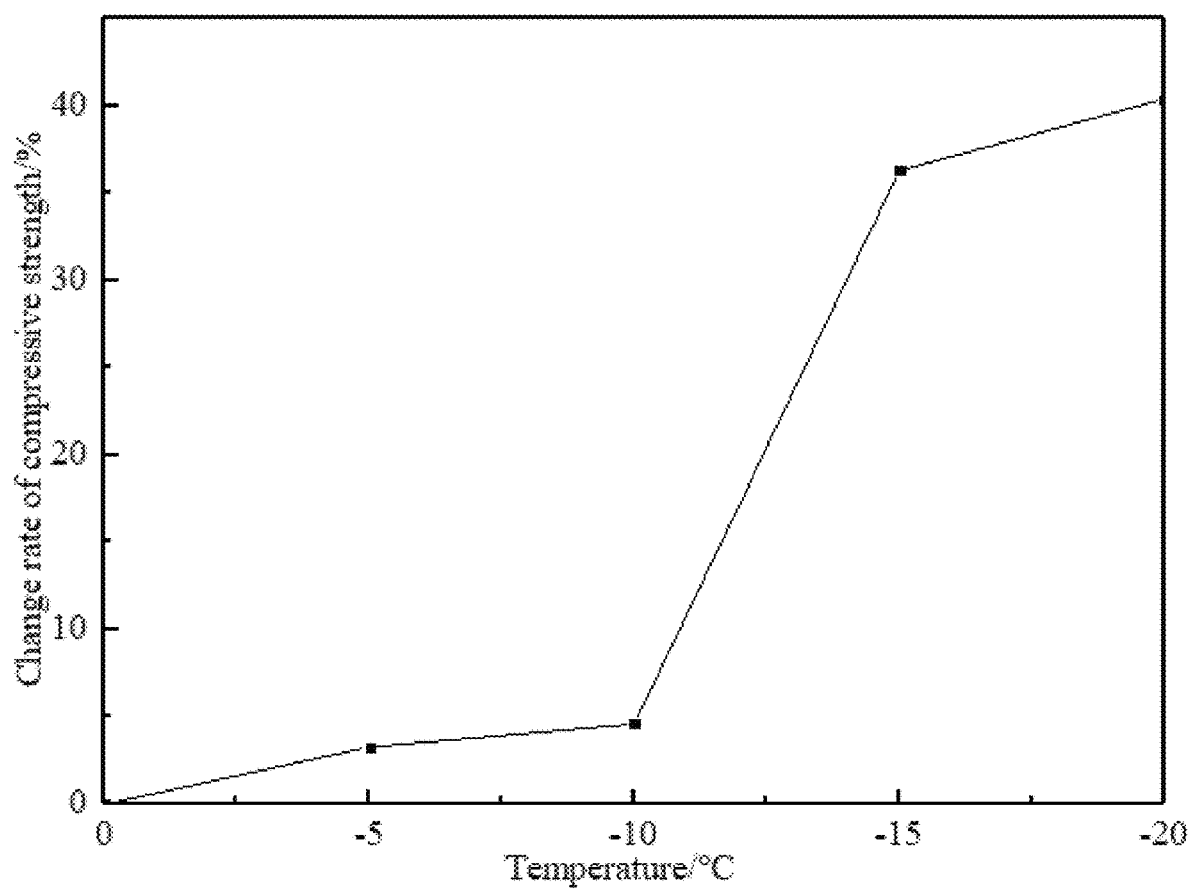
FIG. 4 is a compressive strength change curve of natural pumice concrete at a low temperature.
Figure 5:
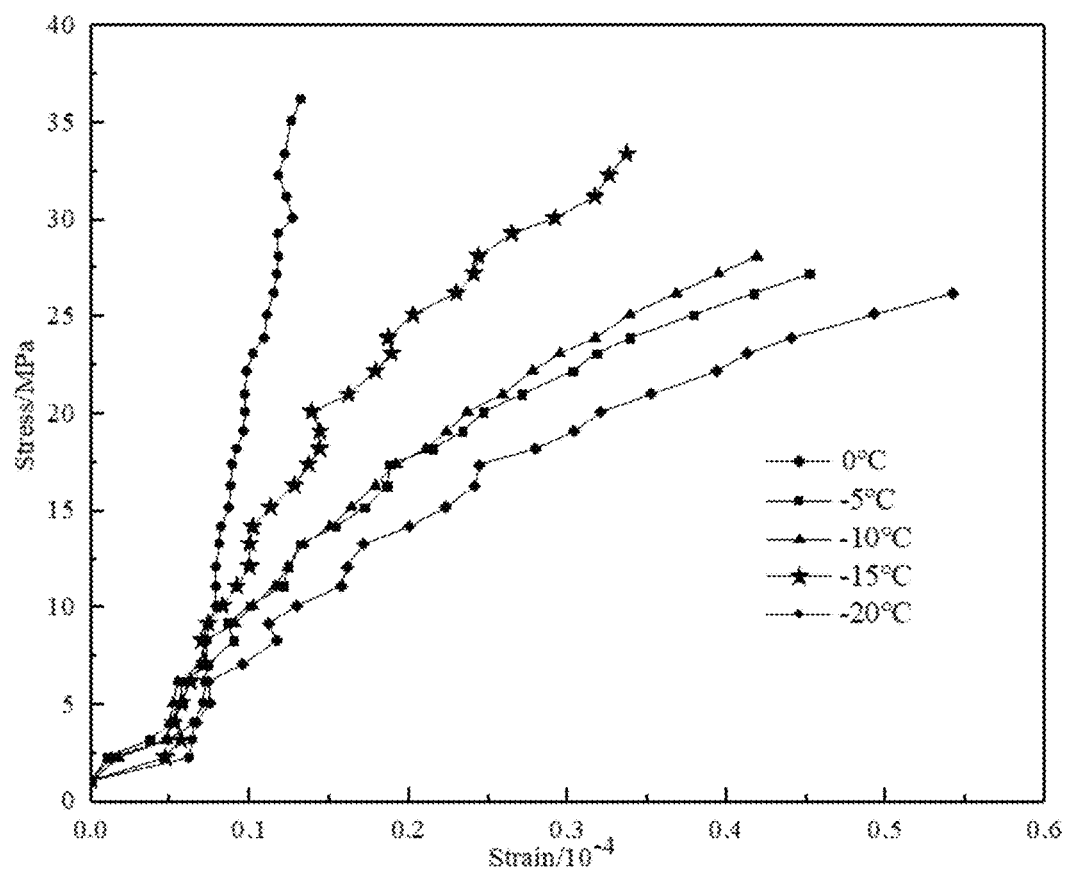
FIG. 5 is a stress-strain curve of natural pumice concrete at a low temperature.
Figure 6:
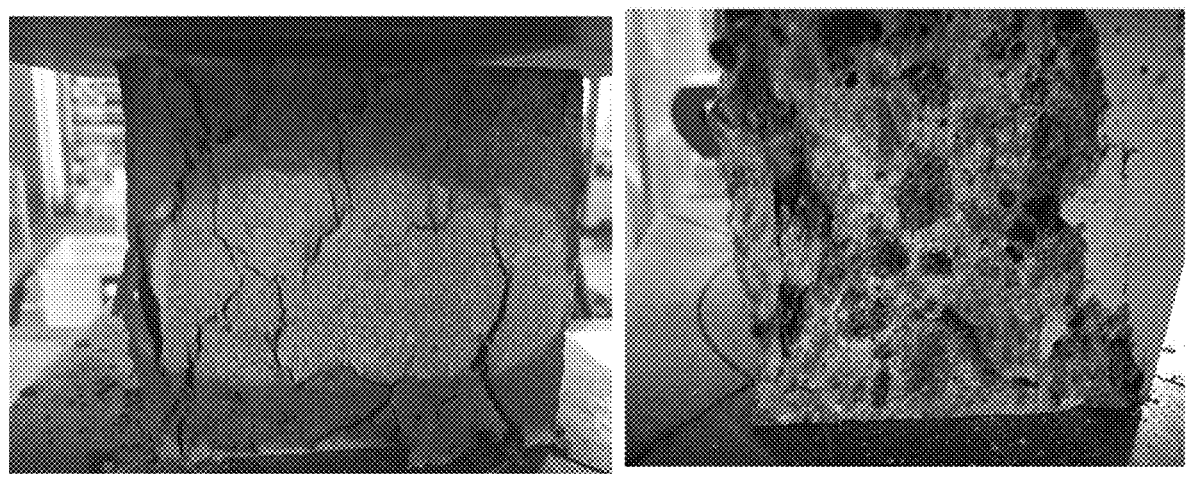
FIG. 6 is a diagram showing a compressive failure of natural pumice concrete at a low temperature.

(2) Concrete having a 28-day curing age was saturated with water as a test block, and the test block was cooled down to 0° C. according to the step 4. A cooling box 2 was cooled to 0° C. according to the step 5, and the compressive strength was tested at 0° C. according to the steps 6, 7 and 8. Then the test block was cooled down to −5° C., −10° C., −15° C. and −20° C., respectively, and the above test was repeated. FIG. 4 shows a change rate of the compressive strength of the natural pumice concrete at a low temperature. FIG. 5 shows a stress-strain curve of the natural pumice concrete at a low temperature. FIG. 6 shows a compressive failure of the natural pumice concrete at a low temperature.

FIG. 4 shows an effect of different low temperatures on the compressive strength of the LC30 strength concrete. It can be seen from the figure that the compressive strength at −5° C., −10° C., −15° C., and −20° C. is increased by 0%, 3.3%, 4.6%, 36.3%, and 40.4% compared to the compressive strength at 0° C. When −20° C.$\leq t \leq 0°$ C., as the temperature decreases, the compressive strength of the concrete gradually increases. This is due to the fact that with the decrease of temperature, water in a pore gradually freezes, resulting in a micro ice segregation effect, and the increase of an ice body improves the strength of the natural pumice concrete. FIG. 5 shows a stress-strain curve of the natural pumice concrete at a low temperature. It can be seen that the stress-strain curves of a sample with the same mix proportion are different at different temperatures. According to FIG. 6, as the temperature decreases, a plurality of vertical cracks first appear on a failure surface of the sample; as the pressure increases, the vertical cracks gradually expand and develop into through cracks. The through cracks lead to the failure of the natural pumice concrete, which is accompanied by a blasting sound, showing a brittle failure. When the test piece was exposed to a normal temperature, the surface showed a white frost.

The test device ensures a low-temperature environment for the concrete and can avoid temperature loss of the concrete during a detection process.

The above embodiments are merely preferred specific implementations of the invention, but the protection scope of the invention is not limited thereto. Any simple variation or equivalent replacement easily made by those skilled in the art within the technical scope of the invention should fall within the protection scope of the invention.

What is claimed is:

1. A test device for controlling a low-temperature environment, comprising a universal testing machine, a cooling box (2), a cold bath device (5), a probe thermometer (9), and a stress-strain data acquisition instrument (8), wherein
the cooling box (2) is formed by welding a double-layer stainless steel plate; the double-layer stainless steel plate forms an interlayer cavity (15) of the cooling box (2); a bottom of the cooling box (2) is hollow; a top of the cooling box (2) is provided with a through hole (21); one side of the cooling box (2) is provided with a liquid inlet (12) near an upper side, and an other side of the cooling box (2) is provided with a liquid outlet (13) near a lower side; both the liquid inlet (12) and the liquid outlet (13) communicate with the interlayer cavity (15); a same side of the liquid outlet (13) is further provided with a test piece access (14); the test piece access (14) is provided with a sealing door (22) hinged to a side wall of the cooling box (2); four walls of the cooling box (2) are provided with a heat insulation plate (16); the probe thermometer (9) is disposed on a side wall of the cooling box (2); a probe of the probe thermometer (9) is disposed inside the cooling box (2); the cold bath device (5) and the interlayer cavity (15) are provided with a freezing liquid;

the universal testing machine comprises a press (4) and an indenter (1) disposed above the press (4); both a top of the press (4) and a bottom of the indenter (1) are provided with a fiberglass reinforced plastic pipe cover (10); the cooling box (2) is disposed on the press (4); the indenter (1) is disposed in the cooling box (2) through the through hole (21); an outlet of the cold bath device (5) communicates with the liquid inlet (12) of the cooling box (2) through a liquid inlet tube (6); an inlet of the cold bath device (5) communicates with the liquid outlet (13) of the cooling box (2) through a liquid outlet tube (7); the stress-strain data acquisition instrument (8) is connected to a sample (3) in the cooling box (2) through a strain gage (19) and a strain gage connection line (11).

2. The test device for controlling a low-temperature environment according to claim 1, wherein the freezing liquid is water plus an alcohol, and a volume ratio of the water to the alcohol is 3:7.

3. The test device for controlling a low-temperature environment according to claim 1, wherein the outlet and the inlet of the cold bath device (5) are respectively provided with a liquid discharge pump (17) and a liquid inlet pump (18); the liquid inlet tube (6) communicates with an outlet of the liquid discharge pump (17), and the liquid outlet (13) communicates with an inlet of the liquid inlet pump (18).

4. A test method for controlling a low-temperature environment using the test device according to claim 3, comprising the following test steps:

step 1, installing the fiberglass reinforced plastic pipe cover (10) on both the top of the press (4) and the bottom of the indenter (1);

step 2, placing the cooling box (2) on the press (4), and extending the indenter (1) into a body of the cooling box (2);

step 3, communicating one end of the liquid inlet tube (6) with the outlet of the liquid discharge pump (17), and communicating another end of the liquid inlet tube (6) with the liquid inlet (12) of the cooling box (2); communicating one end of the liquid outlet tube (7) with the inlet of the liquid inlet pump (18), and communicating another end of the liquid outlet tube (7) with the liquid outlet (13) of the cooling box (2); wrapping a joint of the liquid inlet tube (6) and the liquid outlet tube (7) with a Teflon® tape to prevent leakage, and pouring the freezing liquid into the cold bath device (5);

step 4, putting a plurality of samples (3) with different moisture contents into a refrigerator to cool down, and reducing a temperature of the samples (3) to $t_1°$ C., where $-40° C.\leq t_1° C.\leq 0° C.$;

step 5, opening the cold bath device (5), and adjusting a temperature of the freezing liquid to $t_1°$ C.;

step 6, discharging the freezing liquid into the interlayer cavity (15) of the cooling box (2) by the liquid discharge pump (17), and after the cold bath device (5) is operated for a period of time, detecting a temperature in the center of the cooling box (2) by the probe thermometer (9);

step 7, when the temperature in the center of the cooling box (2) reaches $t_1°$ C., taking out a sample (3) reaching t1° C. from the refrigerator, and attaching the strain gage (19); connecting the strain gage (19) to the stress-strain data acquisition instrument (8) through the strain gage connection line (11); then placing the sample (3) attached with the strain gage (19) into the cooling box (2) through the test piece access (14), and closing the test piece access (14);

step 8, turning on the universal testing machine to perform a mechanical test; applying a pressure to the sample (3) through the indenter (1), and obtaining required data through the stress-strain data acquisition instrument (8);

step 9, setting the temperature of the sample and the temperature of the freezing liquid to $t_2°$ C., $t_2° C.\leq t_1°$ C.; repeating steps 4 to 8 to conduct the mechanical test of concrete at a low temperature until the temperature of the cooling box drops to $-40°$ C.;

step 10, after the test is completed, closing the cold bath device (5), and discharging the freezing liquid in the interlayer cavity (15) of the cooling box (2) into the cold bath device (5) through the liquid inlet pump (18); and step 11, disassembling the liquid inlet tube (6) and the liquid outlet tube (7), and cleaning the interlayer cavity (15) of the cooling box (2) with clean water.

* * * * *